United States Patent [19]

Weingärtner

[11] Patent Number: 4,637,908

[45] Date of Patent: Jan. 20, 1987

[54] PROCESS FOR MANUFACTURING HIGHLY ACTIVE, DISPERSED LOW APPARENT DENSITY ALUMINIUM HYDRATE

[75] Inventor: Fritz Weingärtner, Kerpen Horrem, Fed. Rep. of Germany

[73] Assignee: Swiss Aluminium Ltd., Chippis, Switzerland

[21] Appl. No.: 774,050

[22] Filed: Sep. 9, 1985

[30] Foreign Application Priority Data

Sep. 14, 1984 [CH] Switzerland ............... 4410/84

[51] Int. Cl.$^4$ ............................................. C01F 7/02
[52] U.S. Cl. ................................... 264/143; 423/625; 423/626; 423/628
[58] Field of Search ................. 423/625, 628; 264/143

[56] References Cited

U.S. PATENT DOCUMENTS 4,124,699  11/1978  Michel et al. ............... 423/625
4,344,928  8/1982  Dupin et al. ............... 423/625

Primary Examiner—H. T. Carter
Attorney, Agent, or Firm—Bachman & LaPointe

[57] ABSTRACT

The invention relates to a process for manufacturing highly active, dispersed aluminum hydroxide, of low apparent density. First, unground, very fine grained aluminum tri-hydroxide, of which more than 99% of the grains are at most 3 μm in size, is introduced continuously into a reactor along with a stream of hot dry air, is whirled up and strongly dispersed, heated to 400°–600° C. and shock dehydrated. The low apparent density aluminum oxide flowing out of the reactor in the hot air stream is precipitated out by suitable mechanical means, dispersed in mildly acidic or mildly basic water and rehydrated with the aid of heating. The invention also relates to shaped components of highly active, dispersed low apparent density aluminum oxide having a specific surface area of at least 200 m$^2$/g, a pore volume of more than 1.2 cm$^3$/g and adequate resistance to fracture and wear. The shaped components are in particular produced by treating low apparent density aluminum oxide with rehydrated grains and extruding as a pliable mass, or by rolling the low apparent density aluminum oxide grains in a cumulative granulation process in which water is added during granulation.

14 Claims, No Drawings

PROCESS FOR MANUFACTURING HIGHLY ACTIVE, DISPERSED LOW APPARENT DENSITY ALUMINIUM HYDRATE

BACKGROUND OF THE INVENTION

The present invention relates to a process for the production of highly active, dispersed, low apparent density (L.A.D.) aluminum hydrate, to shaped components made of this highly active, dispersed low apparent density aluminum oxide which has a specific surface area of at least 200 m$^2$/g and features adequate resistance to fracture and wear, and relates too to processes for manufacturing the shaped components.

Several processes for manufacturing shaped components out of active aluminum oxides are known. Common to all these processes for manufacturing active aluminum oxide in granular form is that either ground alumina try-hydrate is transformed with the aid of binders into shaped components, which are then activated by heating under conditions of incomplete removal of water of constitution, or first an active aluminum oxide is prepared in powder form by heating alumina hydrate, then the said powder is ground and granulated under water.

According to the German patent publication No. DE-OS 22 27 804 active aluminum hydroxide granulate materials prepared by the latter method exhibit a specific surface area by BET of 300–450 m/g, a strength at fracture of 15–30 kg and a total pore volume of 40–50 cm$^3$/100 g when prepared by roll granulation. The above mentioned pore volume is much too small for use as catalyst or catalyst support impregnated with catalytic active substances. Material transport in a voluminous body is of course much faster the greater the porosity: the "catalytic activity" is a function of the pore volume. There has therefore been no scarcity of proposals for ways of achieving the largest possible pore volume in active alumina granulate materials. Apart from the expense incurred by the process, one is forced to accept a much reduced fracture strength, as shown in example No. 2 of patent publication No. DE-OS 24 39 543, issued as supplementary to No. DE-OS 22 27 804.

In many processes organic substances are added to the granulate then later burnt off so that pores are produced.

The already mentioned German patent publication No. DE-OS 24 39 543 proposes adding to the finely ground active aluminum oxide powder, prior to the granulation stage, finely ground residue-free, water-soluble salts and/or non-ionogenic substances which do not react with aluminum oxide. The fractions of the mixtures are 30–90 wt.-% aluminum oxide and 10–70% additive. The mixture is granulated under water, the granulate aged for at least 5 hours at 50°–100° C. and then the water-soluble additive washed out. Finally the granulate is dried and activated in the normal manner.

Both processes for manufacturing porous aluminum oxide using additives feature considerable disadvantages. Adding organic substances causes a reduction in the specific surface area because of the high temperatures required to burn off the organic fraction. According to the German patent publication No. 24 39 543 there are considerable effluent problems. Compared with shaped components which are made without additives there is a definite penalty in terms of strength.

German patent publication No. DE-OS 32 43 193 reveals a hydrated aluminum oxide, which can be used as a catalyst, contains essentially pseudo-boehmite, less than 400 ppm Na$_2$O, less than 3 wt.-% sulphate, and has a peptisation index of less then 60 minutes and a free surface area of 200–400 m$^2$/g. Its manufacture is such that an aluminum sulphate solution and a sodium aluminate solution are added simultaneously to a water-containing device. This is conducted in such a manner that a constant pH of <5 is maintained during the precipitation process. After this the pH is shifted to the alkaline side by further addition of sodium aluminate liquor. The precipitated pseudo boehmite is aged, filtered off, washed and dried.

All commercially available, shaped active aluminum oxide components have the disadvantage that, if they have to exhibit adequate resistance to fracture and wear, they have a maximum pore volume of 0.7 cm$^3$/g. Furthermore, expensive wet chemical methods are necessary for their manufacture, aluminumhydroxide first being dissolved and then re-precipitated by addition of ammonia or acids.

SUMMARY OF THE INVENTION

The object of the present invention is therefore to produce a highly active, disperse form of L.A.D. aluminum hydrate, which is a suitable binder and matrix substance for making catalysts, catalyst supports, adsorption and drying agents, also shaped components made of L.A.D. aluminum oxide and having a high pore volume, and also to develop processes for the manufacture of the said shaped components, which, with respect to resistance to fracture and wear satisfy the standards for less porous shaped components, are simple and economic to produce and can be employed in a wide range of applications.

The process according to the invention for manufacturing a highly active, disperse form of L.A.D. aluminum hydrate is such that unground, very fine grained aluminum tri-hydroxide, of which more than 99% of the grains are at most 3 μm in size, is introduced continuously into a reactor along with a dry hot air stream, heated to 400°–600° C., whirled up and strongly dispersed and shock dehydrated such that after a few seconds a stationary condition is reached in the reactor, whereby the amount of partially dehydrated L.A.D. aluminum oxide flowing out is the same as the amount of aluminum tri-hydroxide being added, the L.A.D. aluminum oxide flowing out of the reactor in the air stream is precipitated by suitable mechanical means, dispersed in mildly acidic or mildly basic water and re-hydrated by heating, as a result of which aluminum hydroxide is produced in the form of pseudo-boehmite and/or bayerite gel, and is dried at temperatures below the activation temperature.

The generally known shock dehydration is preferably carried out in a reactor, which is in the form of a cone shaped chamber that narrows towards the bottom. Hot air is introduced tangentially into this chamber and spirals upwards. The fine particulate aluminum tri-hydroxide introduced at the top in the center of the chamber is whirled around and strongly dispersed by the circulating movement. The shock dehydration takes place within a very short time e.g. 2–4 seconds. The particles are then ejected from the reaction chamber and collected in a container or continuously fed to the mildly acidic or mildly basic water for re-hydration or for the continuous build up of granulate.

In practice the average grain size of the fine aluminum tri-hydroxide injected into the reactor for shock dehydration is 0.4–0.6 μm, in particular about 0.5 μm.

The temperature of the dry hot air blown into the reactor is preferably 800°–1200° C. Using conventional means the expert knows how to adjust the air temperature in accordance with the other parameters in order for the particles to reach a final temperature of 400°–600° C. Typical parameters in this respect are for example the amount of hot air, the volume of the reactor, the average grain size of the aluminum tri-hydroxide and the delay time of the particles in the reactor.

The L.A.D. aluminum oxide which is formed after the shock dehydration, and usefully contains 1–8 wt.-% water of constitution, especially 4–6 wt.-%, is preferably precipitated out by means of at least one cyclone or bag filter.

The next stage of the process is the rehydration of the L.A.D. aluminum oxide which has been activated by shock dehydration. For this purpose the said aluminum oxide is added to water, preferably 10–200 kg of low apparent density aluminum oxide is dispersed in 1 m³ of water. The dispersion is usefully heated to 20°–100° C., preferably 40°–80° C. and held at that temperature for 0.5–24 hours, preferably 1.5–3 hours. The water, which acts as a dispersion medium is preferably mildly acidic or mildly basic.

After drying at about 110°–120° C., the L.A.D. aluminum hydrate produced by re-hydration at controlled temperature, pH-value and intensity of stirring exhibits a water content between 34 wt.-% in the case of bayerite and 15–22 wt.-% in the case of pseudo-boehmite. The pseudo-boehmite which is generally the much larger fraction is in the form of a gel. Its pseudo-crystalline character, formed by many lattice faults in the very fine grains, endows the shaped component made of that material with very high porosity and a large specific surface area.

The rehydrated, dried and highly dispersed powder of pseudo-boehmite and/or bayerite is readily peptisable and is suitable therefore as a binder and matrix substance for making shaped components to be employed as catalysts, catalyst supports, and adsorption and drying agents.

DETAILED DESCRIPTION

With respect to the shaped components made of highly active, dispersed L.A.D. aluminum oxide the object of the invention is achieved by way of a very fine structure of unground grains having an Na₂O content of less than 1.5 wt.-% and pore volume of more than 1.2 cm³/g, more than 99% of the grains being at most 1 μm in size.

The very fine grains oxide are preferably precipitated out as aluminum hydroxide using one of the processes described in the German Pat. Nos. DE-PS 897 843 or 952 978, and then dried by conventional means until the desired residual water content of 34 wt.-% is reached. In that process an average grain size of 0.4–0.6 μm normally results, over 99% of the particles having a size of 1 μm or less. At precipitation temperatures of 60°–70° C. the Na₂O content is preferably below 1 wt.-%.

In the field of catalyst technology lower Na2O contents are often required, in special cases less than 0.1 wt.-%. In that case a fine grained material with a corresponding low Na₂O content must be prepared as basis for the shaped component according to the invention. To this end the processes according to the German Pat. Nos. 897 843 or 952 978 for producing fine-grained aluminum hydroxide are modified such that the precipitation takes place at temperatures of about 80° C. or higher.

With respect to the process for manufacturing shaped components the object is achieved according to the invention via a first version in which unground, very fine grained aluminum tri-hydroxide, of which more than 99% of the grains are at most 3 μm in size, is introduced continuously into a reactor along with a dry hot air stream, heated to 400°–600° C., whirled up and strongly dispersed, and shock dehydrated such that after a few seconds a stationary condition is reached in the reactor, whereby the amount of partially dehydrated L.A.D. aluminum oxide flowing out is the same as the amount of aluminum tri-hydroxide being added, L.A.D. aluminum oxide flowing out of the reactor in the air stream is precipitated by suitable mechanical means, dispersed in mildly acidic or mildly basic water and rehydrated by heating, as a result of which aluminum hydroxide is produced for the greater part as a gel of pseudo-boehmite and/or bayerite, the gelled pseudo-boehmite and/or bayerite is/are thickened to a pliable plastizable mass by the addition of shock dehydrated L.A.D. aluminum oxide and/or dried pseudo-boehmite powder and/or dried bayerite in a mixing device, and this mass processed to give shaped components, and dried and activated above 550° C.

The gelled pseudo-boehmite and/or bayerite has/-have a very high water content, for example 80 wt.-% water and 20% solids, and can therefore in no way be shaped. In order to convert it into a pliable mass the gel is preferably placed in a kneading facility, there the total 1.5 to 4 times the amount of shock dehydrated aluminum oxide and/or dried pseudo-boehmite powder and/or dried bayerite added and so a pliable mass formed, if necessary some acid being added in a conventional manner. In this connection it has been found that a mixture of about ⅓ gel and ⅔ L.A.D. aluminum oxide or dried powder has been found favorable. A kneading facility ensures complete mixing of the two components.

Depending on the application the pliable mass is then transformed to the final product by shaping and drying and activating.

For the manufacture of pourable shaped constituents it has been found advantageous to press through an extruder the pliable mass made in a kneading facility. This extruder is preferably of the screw type or roller extruder type; thin strands are formed and then cut into some millimter long pieces by means of a suitable cutting device.

Finally the shaped components are dried and activated in a hot air stream, which in practice is at a temperature slightly above 550° C.

In a further version of the process according to the invention the unground, very fine aluminum tri-hydroxide is dehydrated as described above, and precipitated out of the air stream.

Then, however, the L.A.D. aluminum oxide is rehydrated, not by forming a basically gel type pseudo-boehmite, but by cumulative granulation via the addition of water on a granulating dish, the rolled up granules being removed after reaching a prescribed diameter and then dried in an air stream.

The cumulative granulation takes place essentially via the process described on pages 177-180 of the journal "Aufbereitungstechnik" No. 4/1966 using the device shown there.

Spherical granules 1-10 mm in diameter are produced on such equipment, the larger spheres at the top. The rolling time required depends not only on the size of sphere desired, but also on the degree of compaction.

Finally the shaped components are dried and activated in a hot air stream, which in practice is at a temperature slightly above 550° C.

The analyses performed with conventional measuring methods revealed that both methods enable the desired pore volume of at least 1.2 cm$^3$/g to be reached and exceeded by far. In contrast to other processes, however, also shaped components with a high pore volume suffer no significant loss in strength, which would be expressed in unacceptable crumbling due to insufficient wear resistance or resistance to pressure under load.

It has been found that shaped components of equivalent quality can be produced by both processes.

The shaped components of highly active, dispersed, L.A.D. aluminum oxide can, according to the invention, be employed for example for dehydration, as catalyst supports, adsorbents or drying agents.

What is claimed is:

1. Process for manufacturing highly active, low apparent density dispersed aluminum hydrate, which comprises: providing unground, very fine grained aluminum tri-hydroxide, of which more than 99% of the grains are at most 3 $\mu$m in size; introducing said aluminum tri-hydroxide continuously into a reactor along with a dry hot air stream, said aluminum tri-hydroxide being heated to 400°-600° C., whirled up in a circulating movement, strongly dispersed and partially dehydrated to contain about 1-8 wt. % water in less than about 4 seconds; removing said partially dehydrated aluminum oxide from the reactor in an air stream; providing a stationary condition in the reactor whereby the amount of partially dehydrated aluminum oxide flowing out of said reactor is the same as the amount of aluminum tri-hydroxide being added; precipitating said aluminum oxide flowing out of the reactor in the air stream; dispersing said precipitated aluminum oxide in water and heating said dispersion, as a result of which the aluminum oxide is rehydrated and aluminum hydroxide is produced in the form of gelled-pseudo-boehmite and bayerite; and drying said aluminum hydroxide at temperatures below the activation temperature.

2. Process according to claim 1 wherein said water is mildly acidic.

3. Process according to claim 1 wherein said water is mildly basic.

4. Process according to claim 1 wherein aluminum tri-hydroxide with an average grain size of 0.4-0.6 $\mu$m is partially dehydrated in a 800°-1200° C. hot air stream to a residual water content of 1-8 wt. %, and the resultant fine aluminum oxide precipitated out.

5. Process according to claim 4 wherein the fine aluminum oxide is precipitated out by means of at least one filter.

6. Process according to claim 1 wherein for rehydration 10-200 kg low apparent density aluminum oxide is dispersed in 1 m$^3$ of water, heated to 20°-100° C. and held at that temperature for 0.5-24 hours.

7. Process according to claim 6 wherein the water with low apparent density aluminum oxide dispersed in it is heated to 40°-80° C. and held at that temperature for 1.5-3 hours.

8. Process according to claim 1 wherein said drying step is at a temperature of 110° to 120° C.

9. Process for manufacturing shaped bodies of highly active, dispersed, low apparent density aluminum oxide which comprises: providing unground, very fine grained aluminum tri-hydroxide, of which more than 99% of the grains are at most 3 $\mu$m in size; introducing said aluminum tri-hydroxide continuously into a reactor along with a dry hot air stream, said aluminum tri-hydroxide being heated to 400°-600° C., whirled up in a circulating movement, strongly dispersed, and partially dehydrated to contain about 1-8 wt. % water in less than about 4 seconds; removing said partially dehydrated aluminum oxide from the reactor in an air stream; providing a stationary condition in the reactor whereby the amount of partially dehydrated aluminum oxide flowing out of said reactor is the same as the amount of aluminum tri-hydroxide being added; precipitating said aluminum oxide flowing out of the reactor in the air stream; dispersing said precipitated aluminum oxide in water and heating said dispersion, as a result of which the aluminum oxide is rehydrated and aluminum hydroxide is produced in the form of a gel of pseudo-boehmite and bayerite; thickening said aluminum hydroxide to a pliable mass by the addition of a material selected from the group consisting of partially dehydrated aluminum oxide, dried pseudo-boehmite powder, dried bayerite and mixtures thereof, forming shaped bodies from said mass; and heating above 550° C. to dry and activate same whereby said shaped bodies have a specific surface area of at least 200 m$^2$g, resistance to fracture and wear, a Na$_2$O content of less than 1.5 wt. % and a pore volume of more than 1.2 cm$^3$/g wherein more than 99% of the grains are at most 1 $\mu$m in size.

10. Process according to claim 9 wherein 1.5 to 4 times the amount of said addition material is added to said aluminum hydroxide in a kneading facility, and thus a pliable mass formed.

11. Process according to claim 9 wherein the pliable mass is pressed through an extruder, the resultant strands cut into pieces, then dried and activated in a stream of air.

12. Process according to claim 11 wherein said air stream temperature is above 550° C.

13. Process for manufacturing shaped bodies out of highly active, dispersed low apparent density aluminum which comprises: providing unground, very fine grained aluminum tri-hydroxide, of which more than 99% of the grains are at most 3 $\mu$m in size; introducing said aluminum tri-hydroxide continuously into a reactor along with a dry hot air stream, said aluminum tri-hydroxide being heated to 400°-600° C., whirled up in a circulating movement, strongly dispersed and partially dehydrated to contain about 1-8 wt. % water in less than about 4 seconds; removing said partially dehydrated aluminum oxide from the reactor in an air stream; providing a stationary condition in the reactor whereby the amount of partially dehydrated aluminum oxide flowing out of said reactor is the same as the amount of aluminum tri-hydroxide being added; precipitating said aluminum oxide flowing out of the reactor; conducting said precipitated aluminum oxide along with water into a granulation dish for cumulative granulation; removing the built up granules after reaching a prescribed diameter; and heating to a temperature above 550° C. to dry and activate same.

14. Process according to claim 13 wherein aluminum tri-hydroxide having and average grain size of 0.4–0.6 μm is shock dehydrated in a hot air stream at 800°–1200° C. such that the residual water content is 1–8 wt. %, and the low apparent density aluminum oxide precipitated out preferably by means of at least one filter.

* * * * *